United States Patent
Inoue et al.

(10) Patent No.: US 6,501,596 B1
(45) Date of Patent: Dec. 31, 2002

(54) 1.4-1.52 μM-BAND OPTICAL AMPLIFIER (75) Inventors: Hiroyuki Inoue, Tokyo (JP); Yoshinori Kubota, Yamaguchi (JP); Natsuya Nishimura, Yamaguchi (JP); Kiyotaka Miura, Yamaguchi (JP); Takuya Teshima, Yamaguchi (JP)

(73) Assignee: Central Glass Company, Limited, Ube (JP)

( * ) Notice: Subject to any disclaimer, the term of this patent is extended or adjusted under 35 U.S.C. 154(b) by 0 days.

(21) Appl. No.: 09/987,604

(22) Filed: Nov. 15, 2001

(51) Int. Cl.[7] .................................................. H01S 3/00
(52) U.S. Cl. .................... 359/341.5; 359/342; 359/341.3
(58) Field of Search .............................. 359/341.5, 342, 359/341.3; 372/6

(56) References Cited

U.S. PATENT DOCUMENTS

| | | |
|---|---|---|
| 5,341,237 A | 8/1994 | Tohmon et al. |
| 5,366,937 A | 11/1994 | Schneider |
| 5,659,558 A | 8/1997 | Tohmon et al. |
| 6,047,853 A1 * | 6/2002 | Samson et al. ........ 359/341.31 |

FOREIGN PATENT DOCUMENTS

| | | |
|---|---|---|
| EP | 1039593 | 9/2000 |
| JP | 4180279 | 6/1992 |
| JP | 5275792 | 10/1993 |
| JP | 7045899 | 2/1995 |
| JP | 08018129 A * | 1/1996 |
| JP | 2000307176 | 11/2000 |

OTHER PUBLICATIONS

Tadashi et al, Gain–Shifted Dual–Wavelength–Pumped Thulium–Doped Fiber Amplifier for WDM Signals in the 1.48–1.51-m Wavelength Region (Jan. 2001), IEEE Photonics Technology Letters, vol. 13, No. 1, p. 31–33.*

Payne, et al., "Race–Earth–Doped Fibre Lasers and Amplifiers" 14th European Conference Opt. Communication, 1988.

Huber, et al., "Laser Pumping of Ho–, Tm–, Er–Doped Garnet Lasers at Room Temperature" IEEE Journal of Quantum Electronics, 1988.

Aozasa, et al., "1480–1510 nm–band Tm doped fiber amplifier (TDFA) with a high power conversion efficiency of 42%" Technical Digest Series.

Roy, et al., "48% power conversion efficiency in a single–pump gain–shifted thulium–doped fiber amplifier" Technical Digest Series.

Kasamatsu, et al., "Novel 1.50–μm Band Gain–Shifted Thulium–Doped Fiber Amplifier by using Dual Wavelength Pumping of 1.05 μm and 1.56 μm" Proceeding at OAA, 1999.

Allain, et al., "Tunable CW Lasing Around 0.82, 1.48, 1.88 and 2.35 μm in Thulium–doped Fluorozirconate Fibre" Electronics Letters, 1989.

* cited by examiner

Primary Examiner—Mark Hellner
(74) Attorney, Agent, or Firm—Crowell & Moring LLP

(57) ABSTRACT

The invention relates to a 1.4–1.52 μm-band optical amplifier. This optical amplifier includes (a) a first pumping source for a first pumping light in a wavelength range defined as being not less than 0.65 μm and being less than 0.77 μm; (b) a second pumping source for a second pumping light in a wavelength range of from 1.0 to 1.2 μm; (c) an optical multiplexer for combining said first and second pumping lights with a signal light, to produce a combined light; and (d) a light amplifying optical waveguide for amplifying said signal light by receiving said combined light, said optical waveguide comprising a core doped with Tm. The optical amplifier is highly efficient.

17 Claims, 7 Drawing Sheets

1.4-1.52 μM-BAND OPTICAL AMPLIFIER

BACKGROUND OF THE INVENTION

The present invention relates to an optical amplifier or laser oscillator used for, for example, 1.4–1.52 μm-band optical communication.

Hitherto, 1.55-μm band, which is the lowest loss wavelength of a silica fiber, and 1.3 μm-band, which is zero dispersion wavelength, have been used in optical communication. Research and development of optical amplifiers with respect to these wavelength bands have been active, and considerable successes were achieved particularly for 1.55-μm band. In recent years, there have been demands for Internet and data transfer to have a high-speed and a large-volume. Thus, wavelength division multiplexing (WDM) is put into practical use from the viewpoint of increasing communication volume. The communication volume may, however, become insufficient with the use of only 1.55 μm-band. Thus, there were in recent years proposals for using other bands. In particular, there are strong demands for using the entire region of a wide transmitted wavelength range of quartz fiber of from 1.3 to 1.7 μm. Thus, active research is going on for 1.47 μm-band and 1.65 μm-band Tm doped fiber amplifier.

Figure 1:
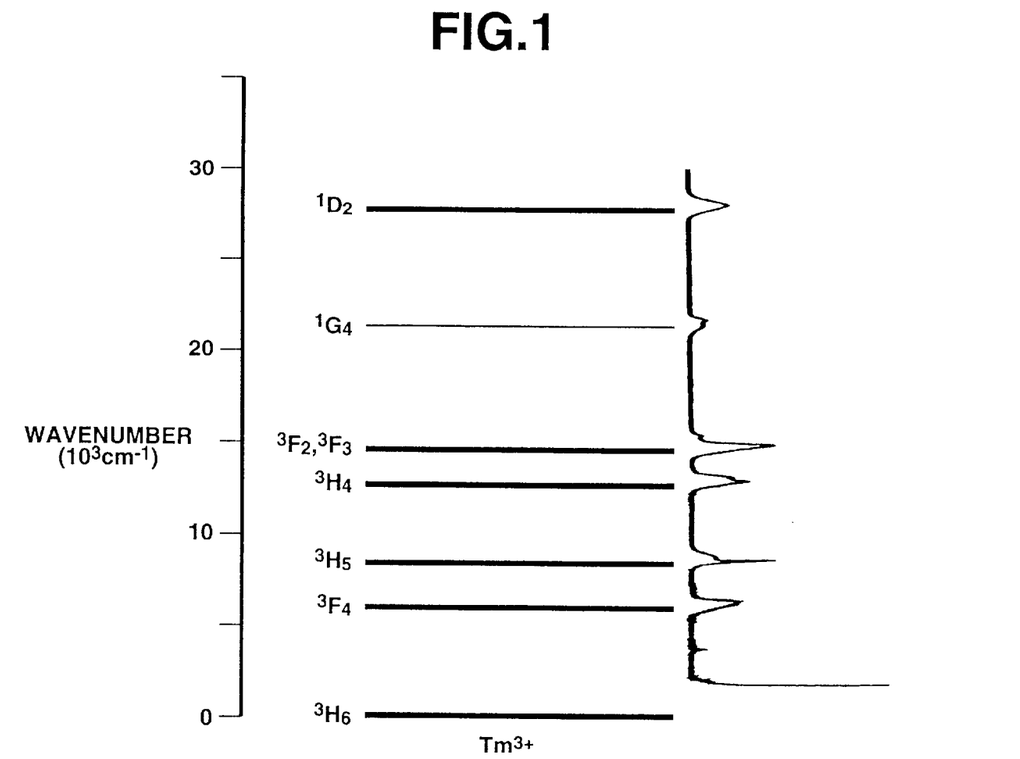
FIG. 1 is a diagram showing the $Tm^{3+}$ energy level and absorption spectrum.

There is a proposal for using a low phonon glass fiber doped with Tm for a 1.47 μm-band amplification or laser oscillation (see "Rare-earth-doped fiber lasers and amplifiers" by D. N. Payne et al., Proc. 14th Europ. Conf. Opt. Comm., Brighton, U.K. 1988, pages 49–53; and IEEE. J. Quantum Electronics Vol. 24(6) (1988) pages 920–923). The Tm energy level is shown in FIG. 1 of the present specification. The 1.47 μm-band amplification is conducted by using a stimulated emission process of $^3H_4 \rightarrow {}^3F_4$. This actually makes it possible to have a wide gain and an amplification band range of from 1.4 to 1.52 μm. Japanese Patent Unexamined Publication JP-A-5-275792 discloses a fiber laser and a fiber amplifier using a fluoride fiber having a core doped with Tm, and 1.06 μm-band light as a pumping light. U.S. Pat. No. 5,366,937, corresponding to JP-A-4-265251, discloses a method for exciting $^3H_4$ of Tm using a pump light wavelength of 0.7–0.89 μm. JP-A-4-180279 discloses a two-steps excitation at 1.2 μm band. It is, however, known to be difficult to obtain population inversion necessary for amplification or laser oscillation, since fluorescence lifetime of $^3H_4$ level of Tm is shorter than that of $^3F_4$. Such characteristic is referred to as "self-terminating mechanism", and this makes it unsuitable for a highly efficient amplification or laser oscillation. Thus, there are several proposals for adding co-dopants (Eu, Tb, Ho and Pr and the like) in order to make the $^3F_4$ lifetime shorter (see JP-A-4-265251; U.S. Pat. No. 5,341,237 corresponding to JP-A-5-145,168; and JP-A-7-45899). However, when these co-dopants are added in a large amount, the tail of the absorption band overlaps with the target wavelength range of 1.4–1.52 μm-band. This may cause an unfavorable energy transfer and an adverse effect on the amplification efficiency of 1.4–1.52 μm-band. Therefore, there is a limitation on the co-dopant concentration and amplification efficiency.

JP-A-2000-307176 discloses an optical fiber amplifier having a first pumping source for a pumping light in a wavelength range of 0.98–1.08 μm and a second pumping source for a pumping light in a wavelength range of 1.08–1.25 μm, 1.51–2.00 μm or 0.77–0.84 μm.

Aozasa et al., OFC2001 Technical Digest Series, PD1 discloses a high $Tm^{3+}$ concentration doped fluoride fiber amplifier with one color 1.4 μm pumping. Roy et al., OFC2001 Technical Digest Series, PD2 discloses the use a dual wavelength pumping at 1.24 μm and 1.40 μm for a thulium-doped fiber amplifier. Kasamatsu et al., Proceedings OAA '99, PDP1 discloses a 1.50-μm band gain-shifted thulium-doped fiber amplifier by using a dual wavelength pumping of 1.05 μm and 1.56 μm. European Patent Application EP 1039593 A2, corresponding to JP-A-2000-340865, also discloses a thulium-doped laser amplifier by using a dual wavelength pumping of 1.04–1.07 μm and 1.53–1.90 μm.

Low phonon energy glass materials are well known as up-conversion laser materials. Thus, when it is tried to amplify a signal light by using a low phonon energy glass material, the pumping energy is consumed by emission of shorter wavelength like a red or blue light. Therefore, 1.4–1.52 μm-band emission efficiency is generally known to be extremely low. 1.4–1.52 μm-band emission from $^3H_4$ to $^3F_4$ of $Tm^{3+}$ is well known as a typical example of self-terminating system, because the fluorescence lifetime of $^3H_4$ is shorter than that of $^3F_4$. Thus, it is difficult to achieve a highly efficient laser oscillation itself (see J. Y. Allain et al., Electronics Letters vol. 25 (1989) pages 1660–1662). There are proposals for making the lifetime of $^3F_4$ shorter by adding a co-dopant such as Eu, Tb, Ho, and Pr. These co-dopants also have a wide absorption wavelength band range. Therefore, when such co-dopant is added in an amount sufficient for making the $^3F_4$ lifetime shorter, absorption may occur at 1.4–1.52 μm-band. Furthermore, the emission efficiency at 1.4–1.52 μm-band may be lowered by the up-conversion process through energy transfer.

It is possible to try to shorten lifetime of $^3F_4$ by using an oscillation of $^3F_4 \rightarrow {}^3H_6$. This is, however, not preferable in obtainment of a 1.4–1.52 μm-band optical amplifier or laser oscillator of a high efficiency, since nearly a half of the pumping light energy is lost.

SUMMARY OF THE INVENTION

It is therefore an object of the present invention to provide a 1.4–1.52 μm-band optical amplifier or laser oscillator of a high efficiency.

According to the present invention, there is provided a 1.4–1.52 μm-band optical amplifier comprising:

(a) a first pumping source for a first pumping light in a wavelength range defined as being not less than 0.65 μm and being less than 0.77 μm;

(b) a second pumping source for a second pumping light in a wavelength range of from 1.0 to 1.2 μm;

(c) an optical multiplexer for combining said first and second pumping lights with a signal light, to produce a combined light; and (d) a light amplifying optical waveguide for amplifying said signal light by receiving said combined light, said optical waveguide comprising a core doped with Tm.

DESCRIPTION OF THE PREFERRED EMBODIMENTS

According to the present invention, it is possible to efficiently achieve a population inversion between $^3H_4$ and $^3F_4$.

As stated above, an optical amplifier according to the present invention has a light amplifying optical waveguide for amplifying a signal light. This optical waveguide has a core doped with Tm and a cladding surrounding the core. The raw material of the core is not particularly limited, as long as it is a material capable of achieving 1.4 μm-band amplification with Tm doping. It is preferable to use a low phonon energy material having a phonon energy of 700 $cm^{-1}$ or less for efficiently achieving an optical amplification or laser oscillation of 1.4–1.52 μm-band (energy difference: about 6,800 $cm^{-1}$) with Tm doping. In contrast, it is not preferable to use a high phonon energy material having a phonon energy of about 1,000 $cm^{-1}$ or greater such as silica-based oxides and boric-acid-based oxides, for that. Therefore, it is also preferable to use such low phonon energy material as the raw material of the core. Examples of such low phonon energy material are low phonon energy glass materials such as oxyhalide glasses, halide-glasses, chalcogenide glasses, chalcohalide glasses, tellurite glasses, bismuthate glasses, germanate glasses, and gallate glasses.

According to the invention, the pumping is conducted by using a combination of a first pumping light having a wavelength $\lambda_1$ in a first range (0.65 μm≦$\lambda_1$<0.77 μm) and a second pumping light having a wavelength $\lambda_2$ in a second range (1.0 μm≦$\lambda_2$≦1.2 μm). With this, it becomes unexpectedly easy to form population inversion. Therefore, it becomes possible to achieve a highly efficient amplification by a low pumping power. Furthermore, it is preferable to add a third pumping light having a wavelength $\lambda_3$ in a third range (1.53 μm≦$\lambda_3$≦1.60 μm) to the combination of the first and second pumping lights. With this, it is possible to suppress an excited state absorption (ESA) of $^3H_5 \rightarrow ^3F_3$ or $^3H_5 \rightarrow ^3F_2$. Thus, the amplification or laser emission efficiency at 1.5 μm band is further improved, and the gain wavelength can be shifted towards a longer wavelength side.

The pumping mechanism according to the invention is explained in detail as follows. As is seen from FIG. 2, $Tm^{3+}$ ions contained in the core of the optical waveguide are pumped by the first pumping light ($\lambda_1$) from the ground state ($^3H_6$) to $^3F_2$, $^3F_3$ or $^3H_4$ (see the circled number 1 in FIG. 2). When they are pumped to $^3F_2$ or $^3F_3$, rapidly transfer to $^3H_4$ state by non-radiative transition (see the circled number 2 in FIG. 2). It is possible to achieve a 1.4–1.52 μm-band amplification by a transition of $^3H_4 \rightarrow ^3F_4$ (see the circled number 3 in FIG. 2). Then, the energy state is pumped again by the second pumping light from $^3F_4$ to $^3F_2$ or $^3F_3$ (see the circled number 4 in FIG. 2). With this pumping, it becomes possible to efficiently reduce population of $^3F_4$, thereby avoiding self-terminating mechanism. By repeating such pumping and light emission from $^3H_4$ to $^3F_4$, efficient amplification achieves at 1.4–1.52 μm-band. In this repetition, $^3F_4$ is used as a so-called virtual ground state-level. This makes it very easy to form population inversion.

Figure 3:
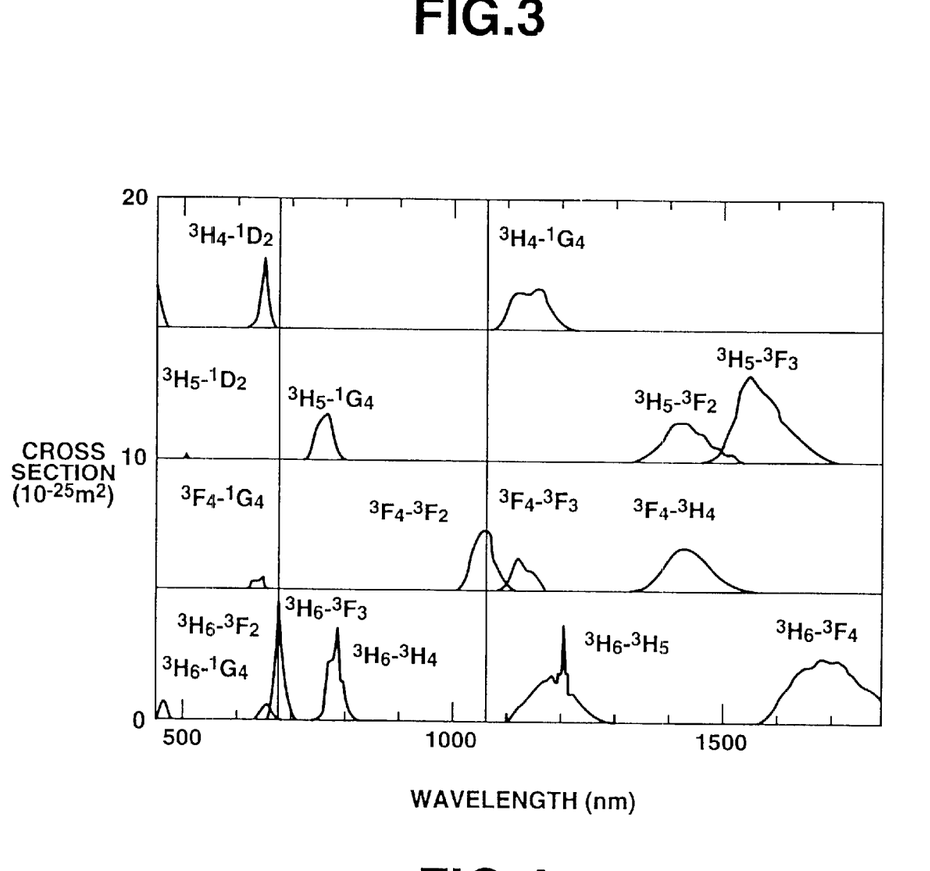
FIG. 3 is a graph showing the absorption cross section from each $Tm^{3+}$ energy level.

As is seen from the $Tm^{3+}$ ions absorption spectrum of FIG. 3, the wavelength $\lambda_1$ of the first pumping source is preferable in a range 0.65 μm≦$\lambda_1$<0.77 μm. Particularly preferably in the range 0.68 μm≦$\lambda_1$<0.72 μm, since it is possible to avoid the up-conversion processes of $^3H_4 \rightarrow ^1D_2$ and $^3H_5 \rightarrow ^1G_4$, simultaneously. Another particularly preferable range of the first pumping wavelength is 0.75 μm≦$\lambda_1$<0.77 μm, since it is possible to suppress a stimulated emission process of $^3H_4 \rightarrow ^3H_6$ by the pumping light, and since it is possible to have a sufficient absorption cross section. In contrast, when the wavelength $\lambda_1$ of the first pumping source is in a range of 0.77–0.85 μm, there may occur a strong stimulated emission of $^3H_4 \rightarrow ^3H_6$ by the pumping light. Thus, background noise may increase, thereby making noise figure inferior. Furthermore, the pumping efficiency may be lowered. When the wavelength $\lambda_1$ of the first pumping source is in a range of less than 0.65 μm, it may become difficult to achieve an efficient pumping due to a small absorption cross section.

The wavelength $\lambda_2$ of the second pumping source is preferable in a range 1.0 μm≦$\lambda_2$≦1.2 μm. Particularly preferably in the range 1.04 μm≦$\lambda_2$≦1.08 μm, since it is possible to avoid the up-conversion processes of $^3H_4 \rightarrow ^1G_4$.

Figure 2:
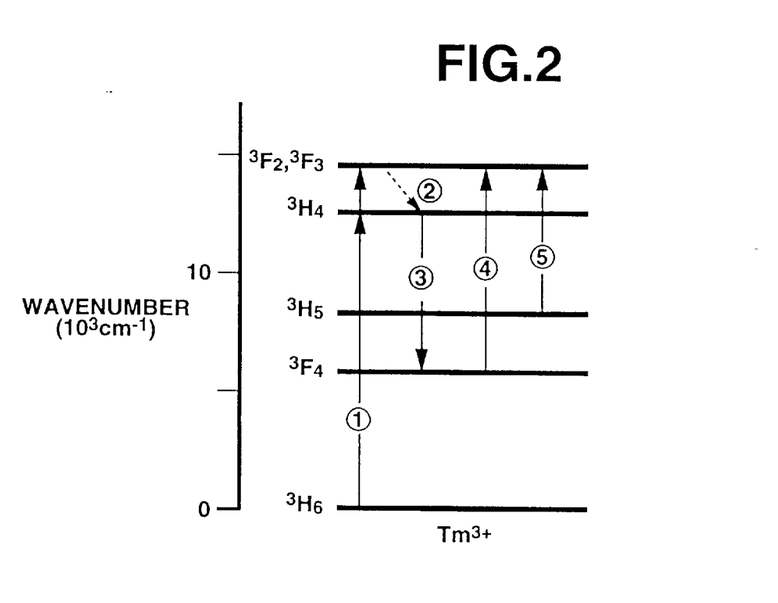
FIG. 2 is a diagram showing the pumping process according to the invention in relation to the $Tm^{3+}$ energy level.

When the third pumping light (wavelength: 1.53–1.60 μm) is added, it is possible to efficiently reduce population of $^3H_5$ by a transition of $^3H_5 \rightarrow ^3F_2$, $^3F_3$ (see the circled number 5 in FIG. 2). As is seen from FIG. 3, when population of $^3H_5$ increases, an excited state absorption (ESA) may occur in a wide wavelength range of 1.4–1.7 μm, thereby lowering amplification efficiency. It is possible to efficiently avoid this ESA by using only the first and second pumping lights, because the pumping scheme that shown in FIG. 2 does not use $^3H_5$ level. However, $^3H_5$ population is never becomes zero, since spontaneous emissions from $^3H_4$, $^3F_2$, and $^3F_3$ to $^3H_5$ occur. If adding the wavelength range 1.53 μm≦$\lambda_3$≦1.60 μm, possible to positively reduce an ESA loss ($^3H_5 \rightarrow ^3F_2$, $^3F_3$ at 1.47 μm band) due to reduction of $^3H_5$ population. Thus, the gain characteristic in a longer wavelength range is improved. Thus, it is possible to improve efficiency of a gain shifted thulium doped fiber amplifier (GS-TDFA).

The optimum wavelengths of the first, second and third pumping lights may be selected depending on the Tm concentration of the core, the optical waveguide length, and the type of the glass material used for the optical waveguide. For example, when a Tm: ZBLAN ($ZrF_4$—$BaF_2$—$LaF_3$—$AlF_3$—$NaF_3$) glass fiber is used for the optical waveguide, the first and second pumping wavelengths may be 0.75 μm and 1.064 μm, respectively. Furthermore, it is possible to add the third pumping light having a wavelength of 1.55 μm in order to shift the gain wavelength.

The optimum powers of the first and second pumping lights may be selected depending on the Tm concentration of the core, the optical waveguide length, the type of the optical waveguide material, numerical aperture of the optical waveguide, and the like. In connection with this, a first power ratio R1, which is defined by the following expression, is preferably in a range of 5–95.

$$R1 = P1/(P1+P2) \times 100$$

where P1 and P2 respectively represent powers of the first and second pumping lights. If R1 is greater than 95 (P2 is too small relative to P1), it may become difficult to form a population inversion between $^3H_4$ and $^3F_4$. With this, it may be difficult to obtain a sufficient amplification efficiency. If R1 is less than 5 (P1 is too small relative to P2), it may become difficult to achieve an effective pumping from the ground state ($^3H_6$)→$^3H_4$. Therefore, gain may not be obtained. It is particularly preferable to adjust R1 in a range of 20–80. With this, it is possible to form population inversion even with a low pumping power.

Similarly, the optimum power of the third pumping light may be selected depending on the Tm concentration of the core, the optical waveguide length, the type of the optical waveguide material, numerical aperture of the optical waveguide, and the like. In connection with this, a second power ratio R2, which is defined by the following expression, is preferably in a range of 5–20.

$$R2 = P3/(P1+P2) \times 100$$

where P3 represents the third pumping light power. If R2 is less than 5 (P3 is too small relative to the total of P1 and P2), the gain wavelength shifting may become insufficient. Even if R2 is greater than 20, a further advantageous effect may not be obtained.

At least one of the first, second and third pumping sources may be a semiconductor laser or a solid-state laser excited by a semiconductor laser. This solid-state laser may be selected from a first laser containing a crystal doped with Nd, Yb or Er, a second laser containing an optical fiber doped with Nd, Yb or Er, and a third laser containing both of these crystal and optical fiber.

The following nonlimitative examples are illustrative of the present invention.

EXAMPLE 1

At first, there was prepared a fluoride glass fiber having a core having a basic chemical composition of 51 mol % $ZrF_4$, 19 mol % $BaF_2$, 4.5 mol % $LaF_3$, 2 mol % $YF_3$, 2 mol % $AlF_3$, 13.5 mol % LiF, and 8 mol % $PbF_2$, and a cladding surrounding the core and having a basic chemical composition of 40 mol % $HfF_4$, 10 mol % $ZrF_4$, 19 mol % $BaF_2$, 3 mol % $LaF_3$, 2 mol % $YF_3$, 4 mol % $AlF_3$, and 22 mol % NaF. This core contained 0.1 mol % of Tm substituted for La contained therein. This fluoride glass fiber had a relative refractive index difference of 1.1%, a cutoff wavelength of 0.65 µm, a core diameter of 2.2 µm and a fiber length of 3 m.

Figure 4:
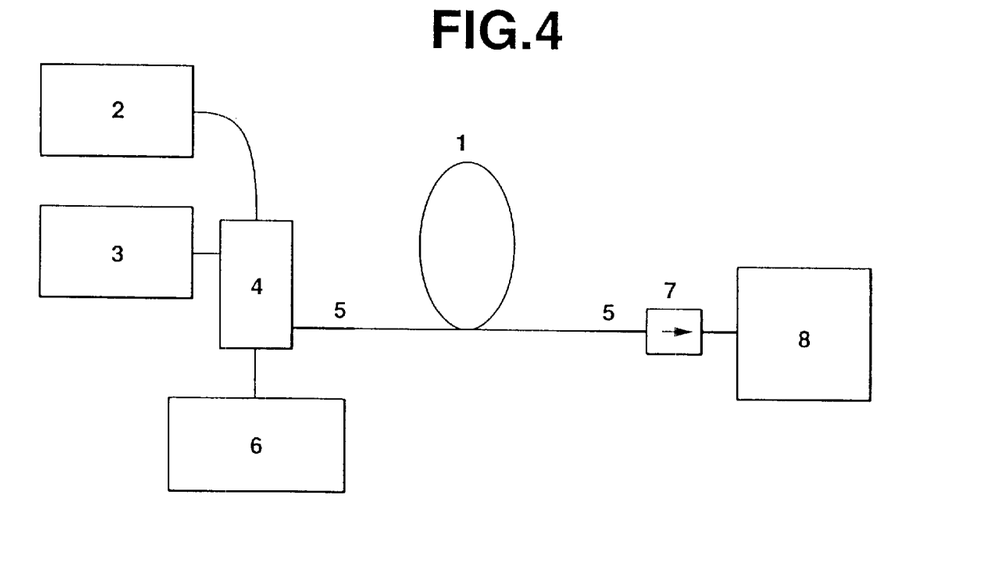
FIG. 4 is a schematic diagram showing an exemplary optical amplifier according to the invention.

Then, as shown in FIG. 4, an optical amplifier was prepared using the above fluoride glass fiber 1 as a light amplifying optical waveguide. This optical amplifier has a semiconductor laser (wavelength: 0.69 µm) 2 for outputting a first pumping light and a Nd:YAG laser (wavelength: 1.064 µm) 3 for outputting a second pumping light. These lasers 2 and 3 are connected with an optical multiplexer 4 for combining the first and second pumping lights together. A high NA silica fiber 5 is used for connecting the optical multiplexer 4 with the fluoride glass fiber 1. Both end faces of the silica fiber 5 and the fluoride fiber 1 were optically polished and aligned with using an optical V groove. After alignment, both fibers were fixed by a UV curable resin. A 1.47 µm-band signal light generator 6 is also connected with the optical multiplexer 4 for combining the signal light with the first and second pumping lights. Another high NA silica fiber 5 is used for connecting the fluoride glass fiber 1 with an optical isolator 7. This optical isolator 7 is capable of suppressing a noise caused by the reflected light. The another silica fiber 5 was also brought into connection with the fluoride glass fiber 1 in the same manner as above.

Figure 5:
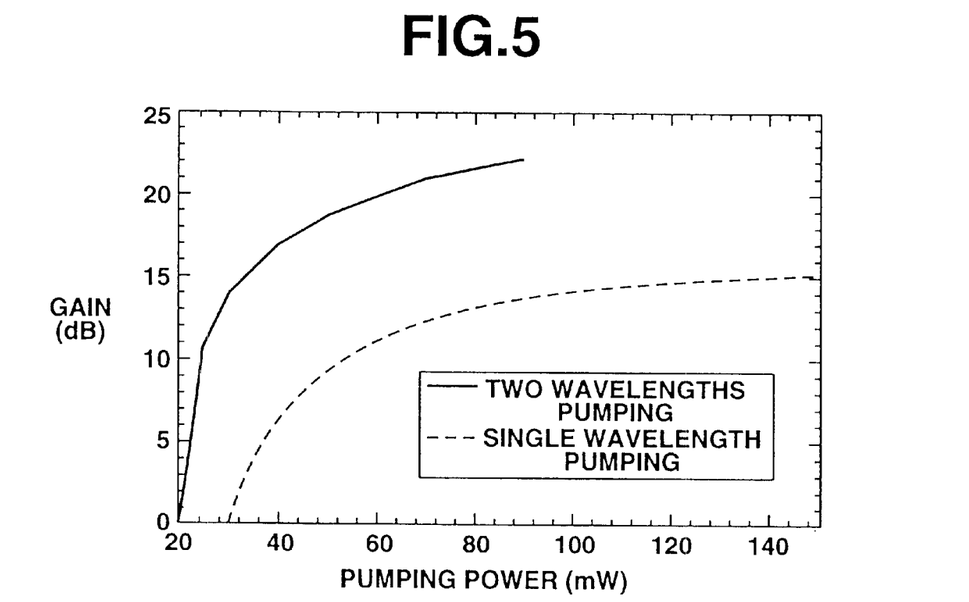
FIG. 5 is a graph showing the gain dependence on the pumping power in Example 1.

In the optical amplifier, the signal light (i.e., a continuous light of a wavelength of 1.47 µm and an intensity of −35 dBm) from the generator 6 was introduced into the fluoride glass fiber 1 through the optical multiplexer 4, then amplified by the fluoride glass fiber 1, then allowed to go through the optical isolator 7, and then detected by a measuring device 8 for determining the small signal gain. The results are shown in FIG. 5; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.064 µm). In this first case, the input power in FIG. 5 is the total input power of the first and second pumping lights, and the input power ratio of the first pumping light to the second pumping light was fixed to 1:1. It is understood from FIG. 5 that a gain improvement of 5 dB or greater was obtained in the two-wavelengths pumping, relative to the single-wavelength pumping and that the threshold pump power of the two-wavelengths pumping was lower than that of the single-wavelength pumping.

EXAMPLE 2

Figure 6:
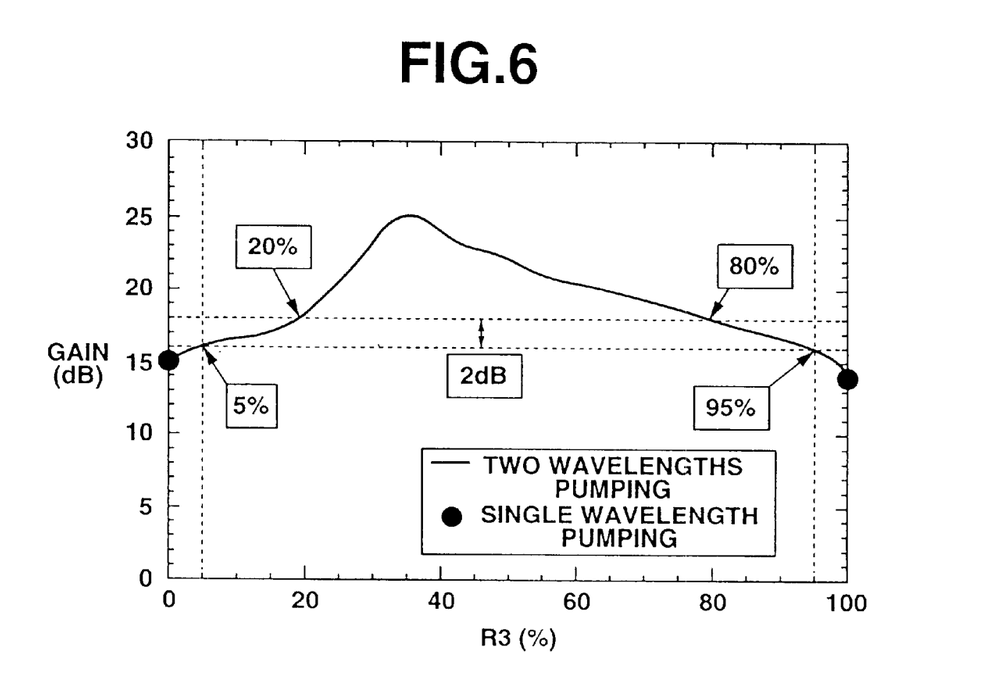
FIG. 6 is a graph showing the gain dependence on the power ratio (R2) in Example 2.

Example 1 was repeated except that an input power ratio R3 was varied as shown in FIG. 6 and that the total input power of the first and second pumping lights was fixed at 100 mW. In fact, the input power ratio R3 can be found by the following expression, $$R3 = P2/(P1+P2) \times 100$$

where P1 represents the input power of the first pumping light (wavelength: 0.69 µm), and P2 represents the input power of the second pumping light (wavelength: 1.064 µm). In other words, the left end black circle in FIG. 6 represents the small signal gain in a first case (a first single-wavelength pumping) in which the signal light was combined with only the first pumping light. Similarly, the right end black circle therein represents the small signal gain in a second case (a second single-wavelength pumping) in which the signal light was combined with only the second pumping light. The solid line between the right and left end black circles represents the small signal gain in a third case (a two-wavelengths pumping) in which the signal light was combined with the first and second pumping lights. It is understood from FIG. 6 that, when R3 was from 5 to 95%, the small signal gain of the two-wavelengths pumping (solid line) was higher than that of the second single-wavelength pumping (the right end black circle). In particular, when R3 was from 20 to 80%, the former was higher than the latter by a value of 2 dB or greater.

EXAMPLE 3

Example 1 was modified as follows. At first, there was prepared an In-based fluoride glass fiber having a core having a basic chemical composition of 18 mol % $InF_3$, 12 mol % $GaF_3$, 20 mol % $ZnF_2$, 27 mol % $BaF_2$, 3 mol % $PbF_2$, 10 mol % $GdF_3$, and 10 mol % $YF_3$, and a cladding surrounding the core and having a basic chemical composition of 18 mol % $InF_3$, 12 mol % $GaF_3$, 20 mol % $ZnF_2$, 18 mol % $BaF_2$, 12 mol % $SrF_2$, 10 mol % $GdF_3$, and 10 mol % $YF_3$. This core contained 0.5 wt % of Tm substituted for a part of Gd contained therein. This fluoride glass fiber had a relative refractive index difference of 1.1%, a cutoff wavelength of 0.74 μm, and a fiber length of 2 m.

The optical amplifier of Example 1 was modified by using a semiconductor laser (wavelength: 0.76 μm) for outputting a first pumping light and an Yb:YAG laser (wavelength: 1.02 μm) 3 for outputting a second pumping light.

Figure 7:
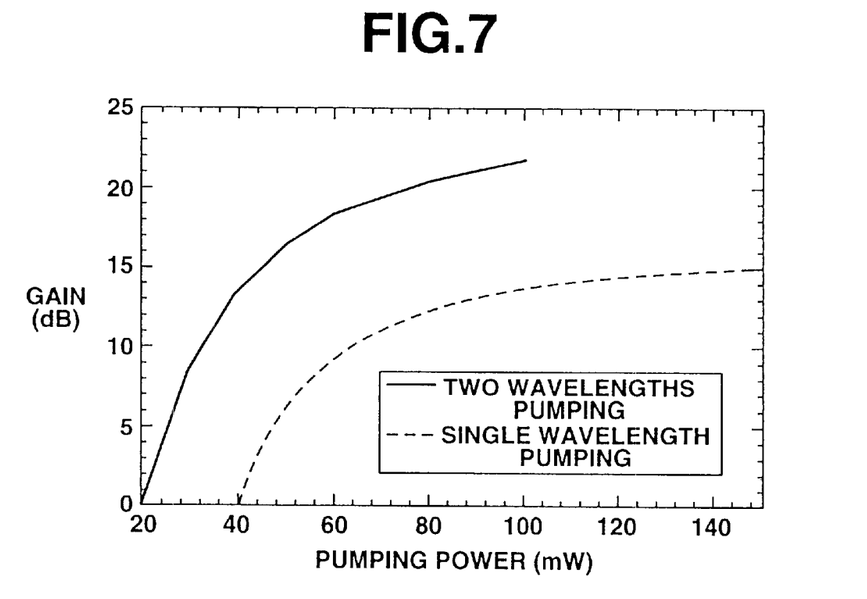
FIGS. 7–11 are graphs showing the gain dependence on the pumping power in Examples 3–7.

The small signal gain was determined by the same manner as that of Example 1. The results are shown in FIG. 7; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.02 μm). It is understood from FIG. 7 that a gain improvement of 5 dB or greater was obtained in the two-wavelengths pumping, relative to the single-wavelength pumping.

EXAMPLE 4

Example 1 was modified as follows. At first, there was prepared a tellurite-based oxide glass fiber having a core having a basic chemical composition of 90 mol % $TeO_2$, 8 mol % BaO, and 2 mol % $La_2O_3$, and a cladding surrounding the core and having a basic chemical composition of 81 mol % $TeO_2$, 16 mol % BaO, and 3 mol % $Y_2O_3$. This core contained 0.6 wt % of Tm substituted for a part of La contained therein. This oxide glass fiber had a relative refractive index difference of 0.7%, a cutoff wavelength of 0.65 μm, and a fiber length of 2 m.

The optical amplifier of Example 1 was modified by using a semiconductor laser (wavelength: 0.695 μm) for outputting a first pumping light and a solid-state laser (wavelength: 1.047 μm) excited by a semiconductor laser for outputting a second pumping light.

Figure 8:
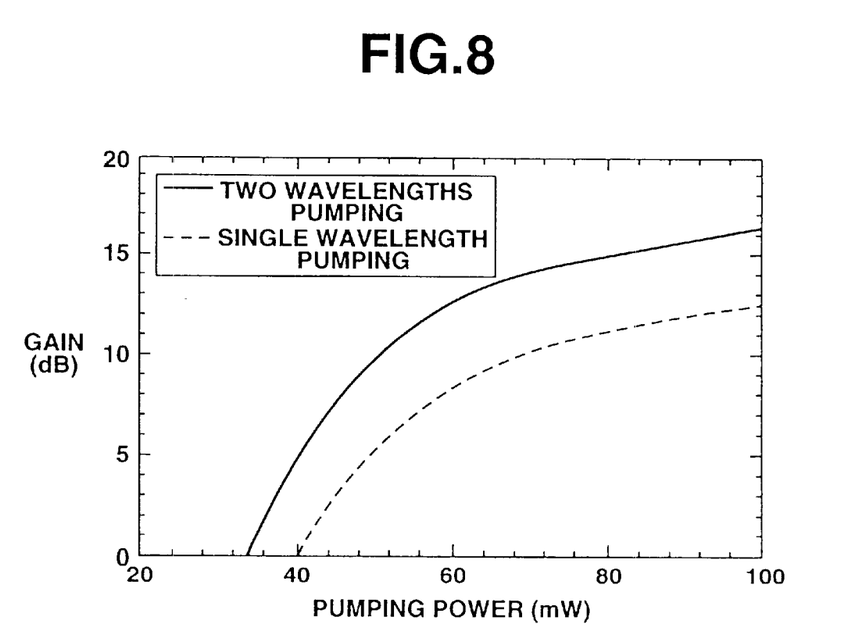

The small signal gain was determined by the same manner as that of Example 1. The results are shown in FIG. 8; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.047 μm). It is understood from FIG. 8 that a gain improvement of 3 dB or greater was obtained in the two-wavelengths pumping, relative to the single-wavelength pumping.

EXAMPLE 5

Example 1 was modified as follows. At first, there was prepared a bismuth-oxide based oxide glass fiber having a core having a basic chemical composition of 75 mol % $Bi_2O_3$, 18 mol % $B_2O_3$, 5 mol % $SiO_2$, and 2 mol % $La_2O_3$, and a cladding surrounding the core and having a basic chemical composition of 70 mol % $Bi_2O_3$, 15 mol % CdO, and 15 mol % $B_2O_3$. This core contained 0.6 wt % of Tm substituted for a part of La contained therein. This oxide glass fiber had a relative refractive index difference of 1.2%, a cutoff wavelength of 0.65 μm, and a fiber length of 2 m.

The optical amplifier of Example 1 was modified by using a semiconductor laser (wavelength: 0.68 μm) for outputting a first pumping light and a solid-state laser (wavelength: 1.053 μm) excited by a semiconductor laser for outputting a second pumping light.

Figure 9:
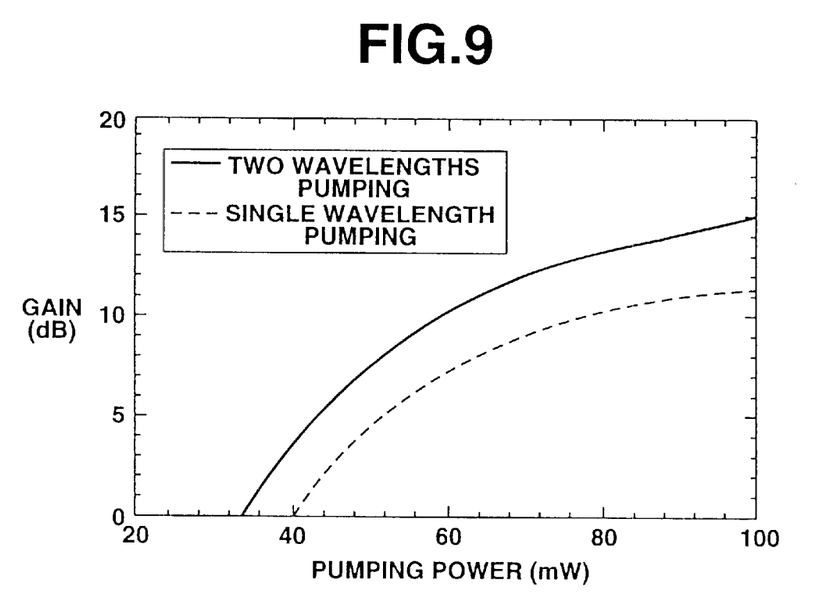

The small signal gain was determined by the same manner as that of Example 1. The results are shown in FIG. 9; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.053 μm). It is understood from FIG. 9 that a gain improvement of 3 dB or greater was obtained in the two-wavelengths pumping, relative to the single-wavelength pumping.

EXAMPLE 6

Example 1 was modified as follows. At first, there was prepared a gallate glass fiber having a core having a basic chemical composition of 30 mol % $K_2O$, 30 mol % $Ta_2O_3$ and 40 mol % $Ga_2O_3$, and a cladding surrounding the core and having a basic chemical composition of 30 mol % $K_2O$, 25 mol % $Ta_2O_3$ and 45 mol % $Ga_2O_3$. This core contained 0.3 wt % of Tm addition to the basic core composition. This glass fiber had a relative refractive index difference of 1.2%, a cutoff wavelength of 0.70 μm, and a fiber length of 8 m.

The optical amplifier of Example 1 was modified by using a semiconductor laser (wavelength: 0.765 μm) for outputting a first pumping light and a solid-state laser (wavelength: 1.064 μm) excited by a semiconductor laser for outputting a second pumping light.

Figure 10:
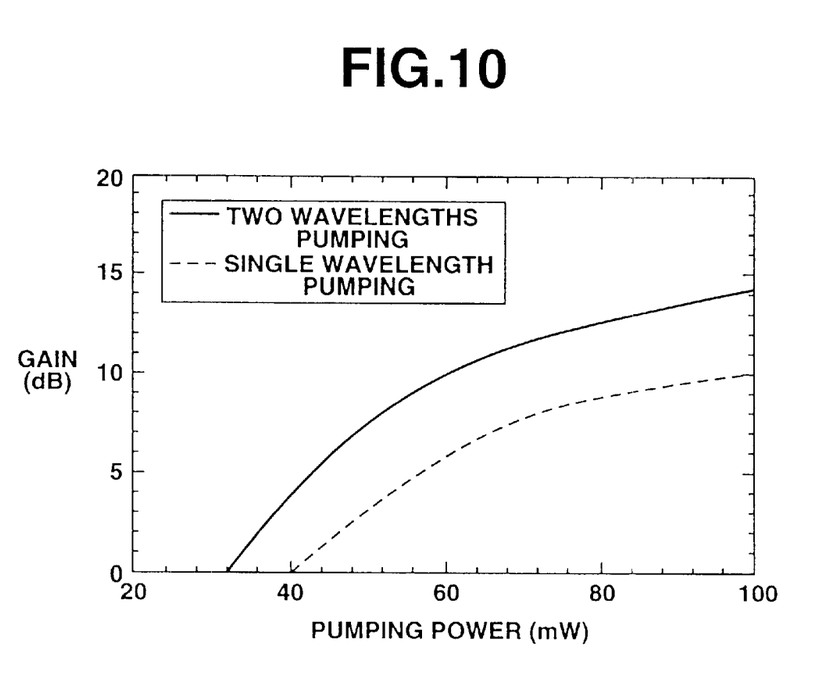

The small signal gain was determined by the same manner as that of Example 1. The results are shown in FIG. 10; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.064 μm). It is understood from FIG. 10 that a gain improvement of 3 dB or greater was obtained in the two-wavelengths pumping, relative to the single-wavelength pumping.

EXAMPLE 7

Example 1 was modified as follows. At first, there was prepared a sulfide glass fiber having a core having a basic chemical composition of 30 mol % $In_2S_3$, 40 mol % $Ga_2S_3$ and 30 mol % $La_2S_3$, and a cladding surrounding the core and having a basic chemical composition of 12 mol % $Al(PO_3)_3$, 11 mol % $AlF_3$, 30.5 mol % $RF_2$ and 46.5 mol % $MF_2$ (R: Mg, Ca; M: Sr, Ba). This core contained 0.2 wt % of Tm substituted for La contained therein. This glass fiber had a relative refractive index difference of 1.2%, a cutoff wavelength of 0.70 μm, and a fiber length of 14 m.

The optical amplifier of Example 1 was modified by using a fiber laser (wavelength: 0.765 μm) excited by a semiconductor laser for outputting a first pumping light and a fiber laser (wavelength: 1.02 μm) excited by a semiconductor laser for outputting a second pumping light. The input power ratio of the first pumping light to the second pumping light was fixed to 2:8.

Figure 11:
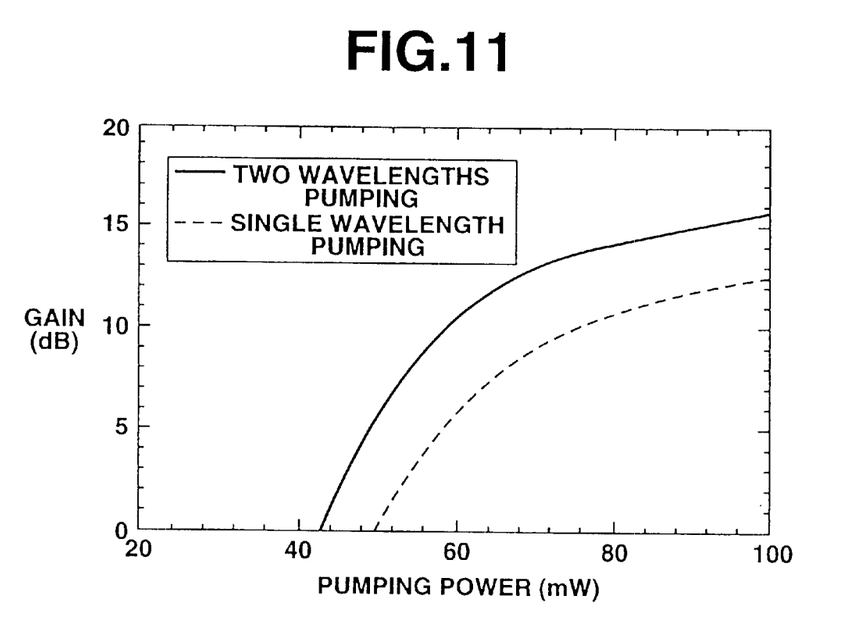

The small signal gain was determined by the same manner as that of Example 1, except that the signal light had a wavelength of 1.50 μm and a power (intensity) of −30 dBm. The results are shown in FIG. 11; the solid line represents the small signal gain variation with the input pumping power in a first case (a two-wavelengths pumping) in which the signal light was combined with the above-mentioned first and second pumping lights, and the broken line represents that in a second case (a single-wavelength pumping) in which the signal light was combined with only the above-mentioned second pumping light (wavelength: 1.02 μm). It is understood from FIG. 11. that a gain improvement of 3 dB or greater was obtained in the two-wavelengths pumping, relative to the single-wavelength pumping.

EXAMPLE 8

Example 1 was modified as follows. Using the optical amplifier of Example 1, power conversion efficiency (PCE) was determined by changing the input power of the signal light (wavelength: 1.47 μm). PCE is defined by the following expression.

PCE(%)=[(output signal power)−(input signal power)]/(pumping power)×100

Figure 12:
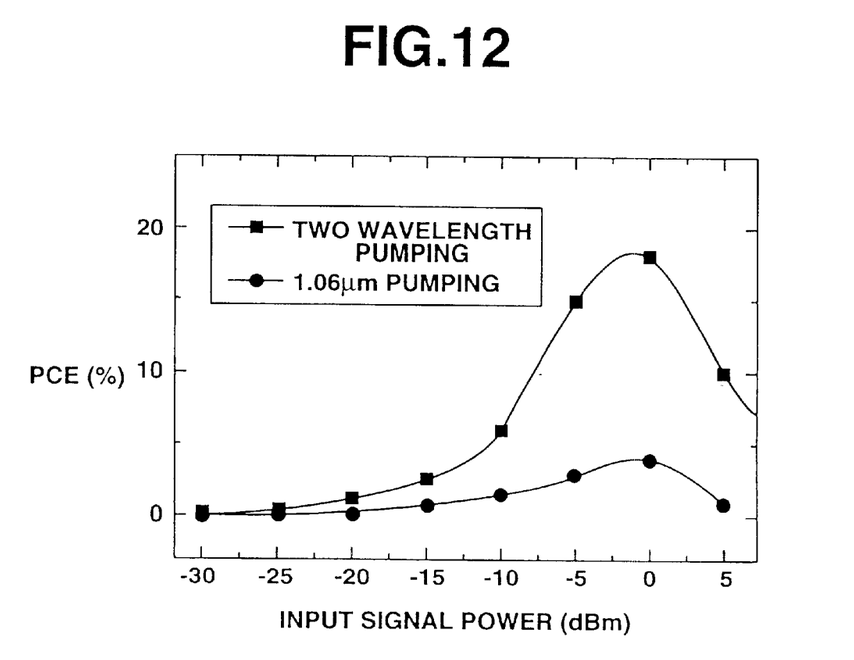
FIG. 12 is a graph showing the power conversion efficiency (PCE) variation with the input signal power in Example 8.

The total pumping power was fixed at 100 mW. The results are shown in FIG. 12; the black squares represent the PCE variation with the input signal power in a first case (a two-wavelengths pumping) in which the signal light was combined with a first pumping light of a semiconductor laser (wavelength: 0.69 μm) and a second pumping light of a solid-state laser (wavelength: 1.064 μm), and the black circles represent that in a second case (a single-wavelength pumping) in which the signal light was combined with only the above-mentioned second pumping light (wavelength: 1.064 μm). The input power ratio of the first pumping light to the second pumping light was fixed to 1:1. It is understood from FIG. 12 that PCE of the two-wavelengths pumping was substantially superior to PCE of the single-wavelength pumping.

EXAMPLE 9

Figure 13:
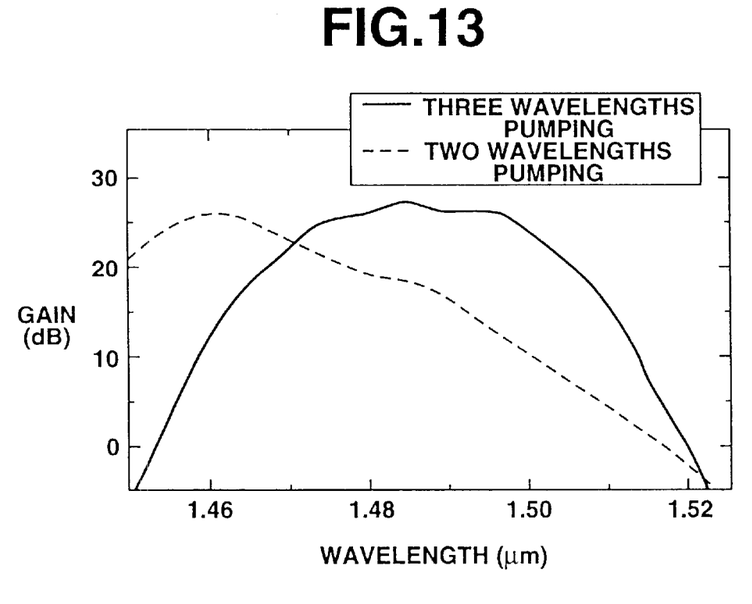
FIG. 13 is a graph showing the gain spectrum of Example 9.

Example 1 was modified as follows. The optical amplifier of Example 1 was modified by adding a third pumping light (wavelength: 1.55 μm; power: 20 mW) to the first and second pumping lights. The total power of the first and second pumping lights was 100 mW. The input power ratio of the first pumping light to the second pumping light was fixed to 1:1. The signal light had an intensity of −35 dBm. The gain spectrum was determined by scanning the signal light wavelength from 1.45 μm to 1.53 μm. The results are shown in FIG. 13; the solid line represents the gain spectrum in a first case (a three-wavelengths pumping) in which the signal light was combined with the above-mentioned first, second and third pumping lights, and the broken line represents that in a second case (a two-wavelengths pumping) in which the signal light was combined with only the above-mentioned first and second pumping lights. It is understood from FIG. 13 that the peak wavelength for obtaining the maximum gain in the three-wavelengths pumping shifted over 20 nm (0.02 μm) toward a longer wavelength (rightwards in FIG. 13), as compared with that in the two-wavelengths pumping. Thus, it is possible to have a so-called gain-shifted optical amplifier in the case of the three-wavelengths pumping. Furthermore, it is understood from FIG. 13 that the gain spectrum became relatively flat at its middle part in the three-wavelengths pumping, as compared with the gain spectrum in the two-wavelengths pumping. In other words, it is possible to maintain the optical amplifier at a high efficiency (high gain) level in the three-wavelengths pumping by setting the signal light wavelength within the middle part of the gain spectrum (solid line) of FIG. 13.

EXAMPLE 10

Figure 14:
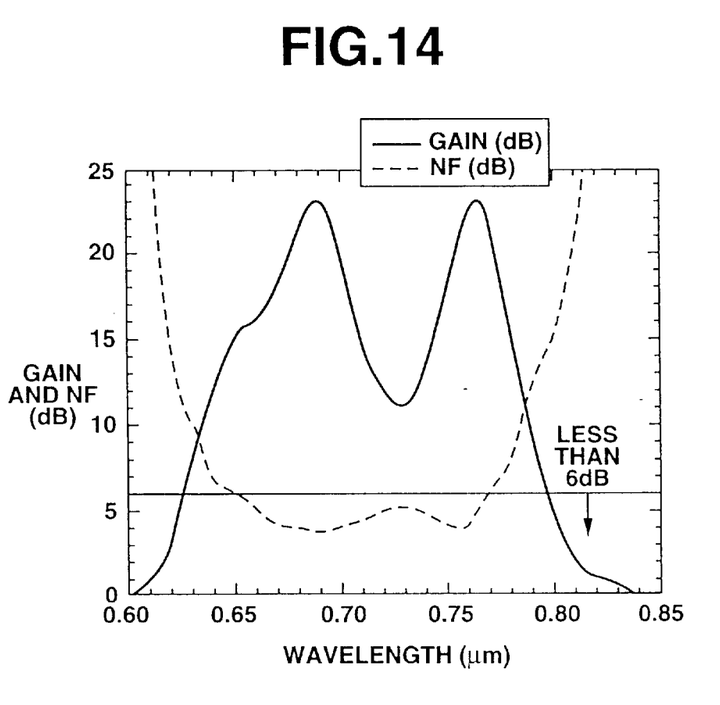
FIG. 14 is a graph showing excitation spectra of the gain and the noise figure (NF) in Example 10.

Example 1 was modified as follows. The optical amplifier of Example 1 was modified by using a Ti: sapphire laser for outputting the first pumping light. The gain spectrum and the noise figure (NF) spectrum were determined by changing the first pumping light wavelength from 0.6 to 0.85 μm. In this determination, the Ti: sapphire laser power was adjusted every time when the first pumping light wavelength was changed, thereby making the Ti: sapphire laser power always constant. The same laser (wavelength: 1.064 μm) as that of Example 1 was used for outputting the second pumping light. The power ratio of the first pumping light to the second pumping light was adjusted to 1:1. The total power of the first and second pumping lights was fixed at 100 mW. The signal light (wavelength: 1.47 μm) power was fixed at −35 dBm. The results of the determination are shown in FIG. 14. As shown in FIG. 14, it is possible to have a gain of 10 dB or greater and a noise figure of 6 dB or less by adjusting the first pumping light wavelength within a range defined as being not less than 0.65 μm and being less than 0.77 μm.

The entire disclosure of each of Japanese Patent Application Nos. 11-176378 filed on Jun. 23, 1999 and 11-195542 filed on Jul. 9, 1999, including specification, claims, summary and drawings, is incorporated herein by reference in its entirety.

What is claimed is:

1. A 1.4–1.52 μm-band optical amplifier comprising:

(a) a first pumping source for a first pumping light in a wavelength range defined as being not less than 0.65 μm and being less than 0.77 μm;

(b) a second pumping source for a second pumping light in a wavelength range of from 1.0 to 1.2 μm;

(c) an optical multiplexer for combining said first and second pumping lights with a signal light, to produce a combined light; and (d) a light amplifying optical waveguide for amplifying said signal light by receiving said combined light, said optical waveguide comprising a core doped with Tm.

2. An optical amplifier according to claim 1, wherein said wavelength range of said first pumping source is a third range of from 0.68 to 0.72 μm or a fourth range defined as being not less than 0.75 μm and being less than 0.77 μm.

3. An optical amplifier according to claim 1, wherein said wavelength range of said second pumping source is from 1.04 to 1.08 μm.

4. An optical amplifier according to claim 1, wherein said core of said optical waveguide comprises a material having a phonon energy of 700 cm$^{-1}$ or less.

5. An optical amplifier according to claim 4, wherein said material is at least one glass selected from the group consisting of oxyhalide glasses, halide glasses, chalcogenide glasses, chalcohalide glasses, tellurite glasses, bismuthate glasses, germanate glasses, and gallate glasses.

6. An optical amplifier according to claim 1, wherein said first and second pumping lights respectively have a first power P1 and a second power P2, and wherein a first power ratio R1 is in a range of from 5 to 95, said first power ratio R1 being defined by the following expression, $$R1=P1/(P1+P2)\times 100.$$

7. An optical amplifier according to claim 6, wherein said first power ratio R1 is in a range of from 20 to 80.

8. An optical amplifier according to claim 1, wherein at least one of said first and second pumping sources is a semiconductor laser.

9. An optical amplifier according to claim 1, wherein at least one of said first and second pumping sources is a solid-state laser excited by a semiconductor laser.

10. An optical amplifier according to claim 9, wherein said solid-state laser is selected from the group consisting of a first laser comprising a crystal doped with Nd or Yb, and a second laser comprising an optical fiber doped with Nd or Yb.

11. An optical amplifier according to claim 1, wherein said optical amplifier comprises a third pumping source for outputting a third pumping light at a wavelength of from 1.53 to 1.60 μm, and wherein said first, second and third pumping lights are combined with said signal light by said optical multiplexer.

12. An optical amplifier according to claim 11, wherein said third pumping source comprises a semiconductor laser or an Er-doped optical fiber laser.

13. An optical amplifier according to claim 11, wherein said first, second and third pumping lights respectively have a first power P1, a second power P2 and a third power P3, and wherein a second power ratio R2 is in a range of from 5 to 20, said second power ratio R2 being defined by the following expression, $$R2=P3/(P1+P2)\times 100.$$

14. A 1.4–1.52 μm-band optical amplifier comprising:
(a) a first means for a first pumping light in a wavelength range defined as being not less than 0.65 μm and being less than 0.77 μm;
(b) a second means for a second pumping light in a wavelength range of from 1.0 to 1.2 μm;
(c) a third means for combining said first and second pumping lights with a signal light, to produce a combined light; and
(d) a fourth means for amplifying said signal light by receiving said combined light, said fourth means comprising a core doped with Tm.

15. A 1.4–1.52 μm-band optical amplifier comprising:
(a) a first pumping source for a first pumping light in a wavelength range defined as being not less than 0.65 μm and being less than 0.77 μm;
(b) a second pumping source for a second pumping light in a wavelength range of from 1.0 to 1.2 μm;
(c) a third pumping source for outputting a third pumping light at a wavelength of from 1.53 to 1.60 μm;
(d) an optical multiplexer for combining said first, second and third pumping lights with a signal light, to produce a combined light; and
(e) a light amplifying optical waveguide for amplifying said signal light by receiving said combined light, said optical waveguide comprising a core doped with Tm.

16. A 1.4–1.52 μm-band optical amplifier comprising:
(a) a semiconductor laser for outputting a first pumping light at a wavelength of about 0.69 μm;
(b) a Nd:YAG laser for outputting a second pumping light at a wavelength of about 1.064 μm;
(c) an optical multiplexer for combining said first and second pumping lights with a signal light having a wavelength of about 1.47 μm, to produce a combined light; and
(d) a fluoride glass fiber for amplifying said signal light by receiving said combined light, said fluoride glass fiber comprising a core doped with Tm.

17. A method for amplifying a 1.4–1.52 μm-band signal light, comprising:
(a) pumping a first light to produce a first pumping light in a wavelength range defined as being not less than 0.65 μm and being less than 0.77 μm;
(b) pumping a second light to produce a second pumping light in a wavelength range of from 1.0 to 1.2 μm;
(c) combining said first and second pumping lights with said signal light to produce a combined light; and
(d) amplifying said signal light by introducing said combined light into a light amplifying optical waveguide, said optical waveguide comprising a core doped with Tm.

* * * * *